United States Patent
Vilsmeier et al.

(10) Patent No.: US 11,501,442 B2
(45) Date of Patent: Nov. 15, 2022

(54) COMPARISON OF A REGION OF INTEREST ALONG A TIME SERIES OF IMAGES

(71) Applicant: Brainlab AG, Munich (DE)

(72) Inventors: Stefan Vilsmeier, Munich (DE); Clara Orlando, Bern (CH); Ron Zenvirt, Mevaseret Zion (IL)

(73) Assignee: Brainlab AG, Munich (DE)

( * ) Notice: Subject to any disclaimer, the term of this patent is extended or adjusted under 35 U.S.C. 154(b) by 0 days.

(21) Appl. No.: 17/039,281

(22) PCT Filed: Aug. 4, 2019

(86) PCT No.: PCT/IL2019/050885
§ 371 (c)(1),
(2) Date: Sep. 30, 2020

(87) PCT Pub. No.: WO2021/024243
PCT Pub. Date: Feb. 11, 2021

(65) Prior Publication Data
US 2022/0207740 A1    Jun. 30, 2022

(51) Int. Cl.
*G06K 9/00* (2022.01)
*G06T 7/00* (2017.01)
*G06T 7/38* (2017.01)

(52) U.S. Cl.
CPC ............ *G06T 7/0016* (2013.01); *G06T 7/38* (2017.01); *G06T 2207/20221* (2013.01); *G06T 2207/30096* (2013.01)

(58) Field of Classification Search
CPC . G06T 2207/20221; G06T 2207/30096; G06T 7/0014–0016; G06T 2207/10076; G06T 7/30–38; G06T 2219/2004; G06T 2207/20212; G06T 7/0012; G06T 2207/30004–30104; G06T 7/10–194; G06T 2207/20112; G06V 40/167; G06V 10/62; G06V 10/759; G06V 30/19013;
(Continued)

(56) References Cited

U.S. PATENT DOCUMENTS 9,082,169 B2 *  7/2015  Thomson ............. G06T 7/0012
2010/0317967 A1  12/2010  Carlsen et al.
(Continued)

OTHER PUBLICATIONS

Duc Fehr; C. Ross Schmidtlein; Sinchun Hwang; Joseph O. Deasy, "Automatic detection and tracking of longitudinal changes of multiple bone metastases from dual energy CT", 2016 IEEE 13th International Symposium on Biomedical Imaging (ISBI), Date of Conference: Apr. 13-16, 2016, pp. 168-171 (Year: 2016).*
(Continued)

*Primary Examiner* — Atiba O Fitzpatrick
(74) *Attorney, Agent, or Firm* — Middleton Reutlinger

(57) ABSTRACT

Disclosed is a computer-implemented method of determining a correspondence between a region of interest as it appears in a first digital medical patient image and as it appears in a second digital medical image. The correspondence is determined by calculating the ratio of overlap of the region of interest with a data object defining an anatomical body part in the first image and the second image and determining whether the larger of the two ratios exceeds a threshold. If the threshold is exceeded, the method assumes that the appearances in the two images describe the same region of interest.

12 Claims, 5 Drawing Sheets

(58) Field of Classification Search
CPC .......... G06V 2201/03; G06V 20/695; G06V 40/162; A61B 6/486; A61B 5/4842; A61B 5/7275; A61B 2090/364; A61B 8/085; A61B 5/7485; A61B 18/18; A61B 6/00; G16H 50/20; G06K 9/6224; A61N 5/00; A61N 5/1002; A61N 5/1014; A61N 5/1016; A61N 5/1027; A61N 5/1045; G21G 4/08; A61M 2205/051–055; A61M 37/0069; A63B 2213/001–003; A61C 19/06; A61H 2201/10; A61H 39/00; A61K 41/0085

See application file for complete search history.

(56) References Cited

U.S. PATENT DOCUMENTS

| | | | | |
|---|---|---|---|---|
| 2019/0163949 | A1* | 5/2019 | Park | G06N 3/0445 |
| 2019/0380656 | A1* | 12/2019 | Park | A61B 8/5223 |
| 2020/0085382 | A1* | 3/2020 | Taerum | G06K 9/6274 |

OTHER PUBLICATIONS

Yan et al. "Automated matching and segmentation of lymphoma on serial CT examinations" Med Phys. Jan. 2007.

Gao et al. "Computer-assisted quantitative evaluation of therapeutic responses for lymphoma using serial PET/CT Imaging" NIH Public Access, Acad Radiol. Apr. 2010.

International Search Report and Written Opinion issued in Application PCT/IL2019/050885 dated Apr. 24, 2020.

Guo et al. "Real time 4D IMRT treatment planning based on a dynamic virtual patient model: Proof of concept", Medical Physics AIP, Melville NY vol. 38, No. 5, pp. 2639-2650 dated May 6, 2011.

Chang et al. "Computer-aided diagnosis of liver tumors on computed tomography images", Computer Methods and Programs in Biomedicine, Elsevier Amsterdam, NL, vol. 145 pp. 45-51 dated Apr. 13, 2017.

* cited by examiner

S21: 3D Scan Dataset(s) with DICOM Segmented objects (input)
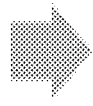
S22: VCP fuses Datasets
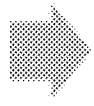
S23: VCP calculates intersection of voxel objects on longitudinal series (on consecutive 3D SCAN Dataset)
S24: VCP matches object pairs
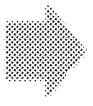
S25: Enriched 3D Scan Dataset(s) (output)
Fig. 2

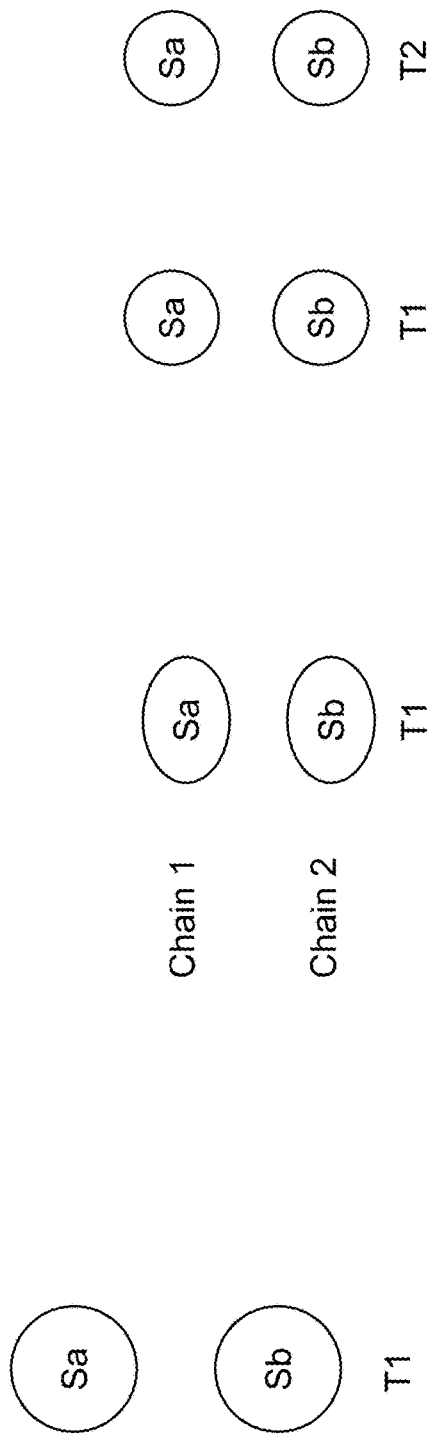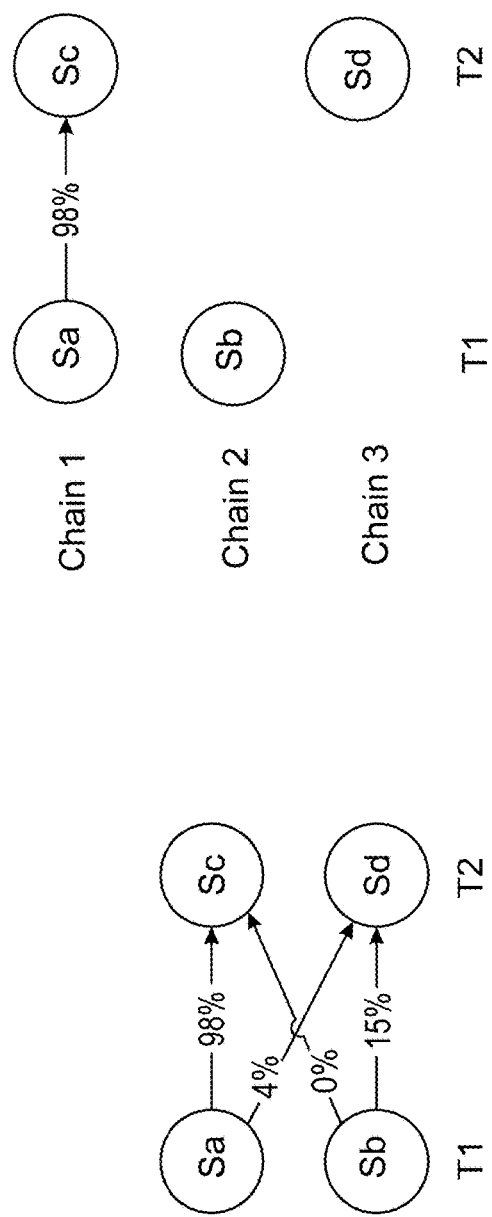

COMPARISON OF A REGION OF INTEREST ALONG A TIME SERIES OF IMAGES

FIELD OF THE INVENTION

The present invention relates to a computer-implemented method of the position of a region of interest described by a first medical image of an anatomical body part in a second other medical image of the anatomical body part, a corresponding computer program, a program storage medium storing such a program and a computer for executing the program, as well as a medical system comprising an electronic data storage device and the aforementioned computer.

TECHNICAL BACKGROUND

In a clinical setting, for instance, evaluation of tumor progression along serial images of the same patient is performed manually by a person with clinical experience who looks at a set of images and interprets the data. Most of the patient information is stored in unstructured forms (e.g. medical notes) or in different locations inside the electronic health record of the hospital. Clinical research today still relies on manual collection and manual enrichment of patient data which is very time consuming, in particular for large pool of patients.

Different tools/methods have been developed to detect and segment objects on diagnostic images, e.g. solid brain tumour. However, they lack providing fully automated object matching along serial image sets. In a clinical setting, screening of image sets collected at different time points during the treatment of a patient and manual data enrichment for clinical research are time-consuming and error-prone, in particular in case of multiple objects of interest (e.g. multiple metastases and tumour recurrence).

The present invention has the object of providing an improved method for automatically matching counterpart objects of interest (e.g., DICOM SEG objects) segmented by users on longitudinal medical patient images.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION OF THE INVENTION

In the following, a short description of the specific features of the present invention is given which shall not be understood to limit the invention only to the features or a combination of the features described in this section.

The disclosed method encompasses determining a correspondence between a region of interest as it appears in a first digital medical patient image and as it appears in a second digital medical image. The correspondence is determined by calculating the ratio of overlap of the region of interest with a data object defining an anatomical body part in the first image and the second image and determining whether the larger of the two ratios exceeds a threshold. If the threshold is exceeded, the method assumes that the appearances in the two images describe the same region of interest.

GENERAL DESCRIPTION OF THE INVENTION

In this section, a description of the general features of the present invention is given for example by referring to possible embodiments of the invention.

In general, the invention reaches the aforementioned object by providing, in a first aspect, a computer-implemented medical method of determining the position of a region of interest described by a first medical image of an anatomical body part in a second other medical image of the anatomical body part. The method comprises executing, on at least one processor of at least one computer (for example at least one computer being part of a navigation system), the following exemplary steps which are executed by the at least one processor.

In a (for example first) exemplary step, first patient image data is acquired which describes a first medical patient image of the anatomical body part including information about the position of an image representation in the first medical patient image of the region of interest, wherein the region of interest is part of the anatomical body part. The first patient image data and the second patient image data are different from one another, for example were generated at different points in time. For example, the first medical patient image and the second medical patient image belong to a time series of medical patient image data sets, wherein the first medical patient image data and the second patient image data were generated at next neighbouring points in time along the time series. For example, the region of interest comprises or consists of an image representation of a medical anomaly being for example at least one of a neural fibre, a cavity, a haemorrhage, a necrosis, and arteriovenous malformation, a tumour or an electrode.

In a (for example second) exemplary step, second patient image data is acquired which describes a second medical patient image of the anatomical body part, wherein the second medical patient image comprises virtual objects each describing a subset of the anatomical body part and comprises an image representation in the second medical patient image of the region of interest. For example, the first patient image data and the second patient image data is defined in three dimensions and for example has been generated by applying a tomographic imaging modality such as computed x-ray imaging or magnetic resonance imaging.

In a (for example third) exemplary step, image registration data is determined based on the first patient image data and the second patient image data, wherein the image registration data describes a mapping between the region of interest described by the first medical patient image and at least one of the virtual objects. The mapping is for example established by applying an image fusion algorithm to the first patient image data and the second patient image data.

In a (for example fourth) exemplary step, first region ratio data is determined based on the first patient image data and the second patient image data and the image registration data, wherein the first region ratio data describes a ratio between the volume of the region of interest described by the second medical patient image and the volume of an intersection of the region of interest described by the first medical patient image with each one of the virtual objects onto which the region of interest described by the first medical patient image is mapped by the mapping between the region of interest described by the second medical patient image and the at least one virtual object.

In a (for example fifth) exemplary step, second region ratio data is determined based on the first patient image data and the second patient image data and the image registration data, wherein the second region ratio data describes a ratio between the volume of the region of interest described by the first medical patient image and the volume of an intersection of the region of interest described by the first medical patient image with each one of the virtual objects onto which the region of interest described by the first medical patient image is mapped by the mapping between the region of interest described by the second medical patient image and the at least one virtual object. For example, the volume of each of the virtual objects is determined by determining an envelope for each of the virtual objects which is defined by the extreme values of the coordinates of the position of the respective virtual object and wherein the volume of the region of interest described by the first medical patient image and the second medical patient image is determined by determining an envelope for the region of interest in the first medical patient image and the second medical patient image which is defined by the extreme values of the coordinates of the position of the region of interest. The envelope is for example embodied by a bounding box around each virtual object. Alternatively, the volume of each of the virtual objects is determined for example by counting the image units (i.e. for example pixels or voxels) comprised in each of the virtual objects and wherein the volume of the region of interest described by the first medical patient image and the second medical patient image is determined by counting the image units comprised in the region of interest in the first medical patient image and the second medical patient image.

In a (for example sixth) exemplary step, region correspondence data is determined based on the first region ratio data and the second region ratio data, wherein the region correspondence data describes that the region of interest described by the first medical patient image corresponds to the region of interest described by the second medical patient image if the greater one of the ratio described by the first region ratio data and the ratio described by the second region ratio data is greater than a predetermined threshold. For example, the region correspondence data is determined only if no correspondence has been established for the region of interest described by the second medical patient image beforehand.

For example, if the first medical patient image and the second medical patient image belong to a time series medical patient image data sets, the method comprises a step of adding, to the time series, third patient data which describes a third medical patient image of the anatomical body part including information about the position of an image representation in the third medical patient image of the region of interest, wherein the third patient image data was generated at a point of time along the time series lying in between the points in time at which the first patient image data and the second patient image data were generated, wherein the point of time at which the third patient image data was generated is a next neighbour along the time series to the points of time at which the first patient image data and the second patient image data were generated. The region correspondence data is then determined based on the first patient image data and the third patient image data by using the third patient image data as the second patient image data, and the region correspondence data is then also determined based on the third patient image data and the second patient image data by using the third patient image data as the first patient image data.

In a second aspect, the invention is directed to a computer program which, when running on at least one processor (for example, a processor) of at least one computer (for example, a computer) or when loaded into at least one memory (for example, a memory) of at least one computer (for example, a computer), causes the at least one computer to perform the above-described method according to the first aspect. The invention may alternatively or additionally relate to a (physical, for example electrical, for example technically generated) signal wave, for example a digital, for example electronic, signal wave, such as an electromagnetic carrier wave carrying information which represents the program, for example the aforementioned program, which for example comprises code means which are adapted to perform any or all of the steps of the method according to the first aspect. The signal wave is in one example a data carrier signal carrying the aforementioned computer program. A computer program stored on a disc is a data file, and when the file is read out and transmitted it becomes a data stream for example in the form of a (physical, for example electrical, for example technically generated) signal. The signal can be implemented as the signal wave, for example as the electromagnetic carrier wave which is described herein. For example, the signal, for example the signal wave is constituted to be transmitted via a computer network, for example LAN, WLAN, WAN, mobile network, for example the internet. For example, the signal, for example the signal wave, is constituted to be transmitted by optic or acoustic data transmission. The invention according to the second aspect therefore may alternatively or additionally relate to a data stream representative of the aforementioned program.

In a third aspect, the invention is directed to a computer-readable program storage medium on which the program according to the second aspect is stored. The program storage medium is for example non-transitory.

In a fourth aspect, the invention is directed to at least one computer (for example, a computer), comprising at least one processor (for example, a processor) and at least one memory (for example, a memory), wherein the program according to the second aspect is running on the processor or is loaded into the memory, or wherein the at least one computer comprises the computer-readable program storage medium according to the third aspect.

In a fifth aspect, the invention is directed to a medical system, comprising:
a) the at least one computer according to the fourth aspect; and
b) at least one electronic data storage device storing at least the first patient image data and the second patient image data and the atlas data,
wherein the at least one computer is operably coupled to the at least one electronic data storage device for acquiring, from the at least one data storage device, at least the first patient image data and the second patient image data and the atlas data, and
the at least one electronic data storage device for storing, in the at least one data storage device, the region correspondence data.

In a sixth aspect, the invention is directed to a radiation treatment planning station comprising the system according to the fifth aspect.

In a seventh aspect, the invention is directed to use of the method according to the first aspect for planning a radiation treatment procedure, wherein the use comprises execution of the steps of the method according to the first aspect.

Alternatively or additionally, the invention according to the fifth aspect is directed to a for example non-transitory computer-readable program storage medium storing a program for causing the computer according to the fourth aspect to execute the data processing steps of the method according to the first aspect.

For example, the invention does not involve or in particular comprise or encompass an invasive step which would represent a substantial physical interference with the body requiring professional medical expertise to be carried out and entailing a substantial health risk even when carried out with the required professional care and expertise.

For example, the invention does not comprise a step of applying radiation such as ionizing radiation to the human or animal body for example to generate the first patient image data or the second patient image data or the atlas data or insert an object such as an electrode into the human or animal body. More particularly, the invention does not involve or in particular comprise or encompass any surgical or therapeutic activity. The invention is instead directed as applicable to acquiring, for example receiving and/or reading, the already generated first and second patient image data and the atlas data as input to the method according to the first aspect. For this reason alone, no surgical or therapeutic activity and in particular no surgical or therapeutic step is necessitated or implied by carrying out the invention.

DEFINITIONS

In this section, definitions for specific terminology used in this disclosure are offered which also form part of the present disclosure.

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term computer includes a server resource. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a program which, when running on a computer, causes the computer to perform one or more or all of the method steps described herein and/or to a program storage medium on which the program is stored (in particular in a non-transitory form) and/or to a computer comprising said program storage medium and/or to a (physical, for example electrical, for example technically generated) signal wave, for example a digital signal wave, such as an electromagnetic carrier wave carrying information which represents the program, for example the aforementioned program, which for example comprises code means which are adapted to perform any or all of the method steps described herein.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. A step of "determining" as described herein for example comprises or consists of issuing a command to perform the determination described herein. For example, the step comprises or consists of issuing a command to cause a computer, for example a remote computer, for example a remote server, for example in the cloud, to perform the determination. Alternatively or additionally, a step of "determination" as described herein for example comprises or consists of receiving the data resulting from the determination described herein, for example receiving the resulting data from the remote computer, for example from that remote computer which has been caused to perform the determination. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

Image registration is the process of transforming different sets of data into one coordinate system. The data can be multiple photographs and/or data from different sensors, different times or different viewpoints. It is used in computer vision, medical imaging and in compiling and analysing images and data from satellites. Registration is necessary in order to be able to compare or integrate the data obtained from these different measurements.

Preferably, atlas data is acquired which describes (for example defines, more particularly represents and/or is) a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data. The atlas data comprises image information (for example, positional image information) which can be matched (for example by applying an elastic or rigid image fusion algorithm) for example to image information (for example, positional image information) contained in medical image data so as to for example compare the atlas data to the medical image data in order to determine the position of anatomical structures in the medical image data which correspond to anatomical structures defined by the atlas data.

The human bodies, the anatomy of which serves as an input for generating the atlas data, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects.

For example, the atlas data includes information of the anatomical body part. This information is for example at least one of patient-specific, non-patient-specific, indication-specific or non-indication-specific. The atlas data therefore describes for example at least one of a patient-specific, non-patient-specific, indication-specific or non-indication-specific atlas. For example, the atlas data includes movement information indicating a degree of freedom of movement of the anatomical body part with respect to a given reference (e.g. another anatomical body part). For example, the atlas is a multimodal atlas which defines atlas information for a plurality of (i.e. at least two) imaging modalities and contains a mapping between the atlas information in different imaging modalities (for example, a mapping between all of the modalities) so that the atlas can be used for transforming medical image information from its image depiction in a first imaging modality into its image depiction in a second imaging modality which is different from the first imaging modality or to compare (for example, match or register) images of different imaging modality with one another.

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (for example so-called medical imaging modalities and/or radiological imaging methods) such as for instance computed tomography (CT) and cone beam computed tomography (CBCT, such as volumetric CBCT), x-ray tomography, magnetic resonance tomography (MRT or MRI), conventional x-ray, sonography and/or ultrasound examinations, and positron emission tomography. For example, the medical imaging methods are performed by the analytical devices. Examples for medical imaging modalities applied by medical imaging methods are: X-ray radiography, magnetic resonance imaging, medical ultrasonography or ultrasound, endoscopy, elastography, tactile imaging, thermography, medical photography and nuclear medicine functional imaging techniques as positron emission tomography (PET) and Single-photon emission computed tomography (SPECT), as mentioned by Wikipedia. The image data thus generated is also termed "medical imaging data". Analytical devices for example are used to generate the image data in apparatus-based imaging methods. The imaging methods are for example used for medical diagnostics, to analyse the anatomical body in order to generate images which are described by the image data. The imaging methods are also for example used to detect pathological changes in the human body. However, some of the changes in the anatomical structure, such as the pathological changes in the structures (tissue), may not be detectable and for example may not be visible in the images generated by the imaging methods. A tumour represents an example of a change in an anatomical structure. If the tumour grows, it may then be said to represent an expanded anatomical structure. This expanded anatomical structure may not be detectable; for example, only a part of the expanded anatomical structure may be detectable. Primary/high-grade brain tumours are for example usually visible on MRI scans when contrast agents are used to infiltrate the tumour. MRI scans represent an example of an imaging method. In the case of MRI scans of such brain tumours, the signal enhancement in the MRI images (due to the contrast agents infiltrating the tumour) is considered to represent the solid tumour mass. Thus, the tumour is detectable and for example discernible in the image generated by the imaging method.

In addition to these tumours, referred to as "enhancing" tumours, it is thought that approximately 10% of brain tumours are not discernible on a scan and are for example not visible to a user looking at the images generated by the imaging method.

Mapping describes a transformation (for example, linear transformation) of an element (for example, a pixel or voxel), for example the position of an element, of a first data set in a first coordinate system to an element (for example, a pixel or voxel), for example the position of an element, of a second data set in a second coordinate system (which may have a basis which is different from the basis of the first coordinate system). In one embodiment, the mapping is determined by comparing (for example, matching) the color values (for example grey values) of the respective elements by means of an elastic or rigid fusion algorithm. The mapping is embodied for example by a transformation matrix (such as a matrix defining an affine transformation).

Image fusion can be elastic image fusion or rigid image fusion. In the case of rigid image fusion, the relative position between the pixels of a 2D image and/or voxels of a 3D image is fixed, while in the case of elastic image fusion, the relative positions are allowed to change.

In this application, the term "image morphing" is also used as an alternative to the term "elastic image fusion", but with the same meaning.

Elastic fusion transformations (for example, elastic image fusion transformations) are for example designed to enable a seamless transition from one dataset (for example a first dataset such as for example a first image) to another dataset (for example a second dataset such as for example a second image). The transformation is for example designed such that one of the first and second datasets (images) is deformed, for example in such a way that corresponding structures (for example, corresponding image elements) are arranged at the same position as in the other of the first and second images. The deformed (transformed) image which is transformed from one of the first and second images is for example as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are for example vectors of a deformation field. These vectors are determined by the optimisation algorithm in such a way as to result in an optimum degree of similarity. Thus, the optimum degree of similarity represents a condition, for example a constraint, for the optimisation algorithm. The bases of the vectors lie for example at voxel positions of one of the first and second images which is to be transformed, and the tips of the vectors lie at the corresponding voxel positions in the transformed image. A plurality of these vectors is preferably provided, for instance more than twenty or a hundred or a thousand or ten thousand, etc. Preferably, there are (other) constraints on the transformation (deformation), for example in order to avoid pathological deformations (for instance, all the voxels being shifted to the same position by the transformation). These constraints include for example the constraint that the transformation is regular, which for example means that a Jacobian determinant calculated from a matrix of the deformation field (for example, the vector field) is larger than zero, and also the constraint that the transformed (deformed) image is not self-intersecting and for example that the transformed (deformed) image does not comprise faults and/or ruptures. The constraints include for example the constraint that if a regular grid is transformed simultaneously with the image and in a corresponding manner, the grid is not allowed to interfold at any of its locations. The optimising problem is for example solved iteratively, for example by means of an optimisation algorithm which is for example a first-order optimisation algorithm, such as a gradient descent algorithm. Other examples of optimisation algorithms include optimisation algorithms which do not use derivations, such as the downhill simplex algorithm, or algorithms which use higher-order derivatives such as Newton-like algorithms. The optimisation algorithm preferably performs a local optimisation. If there is a plurality of local optima, global algorithms such as simulated annealing or generic algorithms can be used. In the case of linear optimisation problems, the simplex method can for instance be used.

In the steps of the optimisation algorithms, the voxels are for example shifted by a magnitude in a direction such that the degree of similarity is increased. This magnitude is preferably less than a predefined limit, for instance less than one tenth or one hundredth or one thousandth of the diameter of the image, and for example about equal to or less than the distance between neighbouring voxels. Large deformations can be implemented, for example due to a high number of (iteration) steps.

The determined elastic fusion transformation can for example be used to determine a degree of similarity (or similarity measure, see above) between the first and second datasets (first and second images). To this end, the deviation between the elastic fusion transformation and an identity transformation is determined. The degree of deviation can for instance be calculated by determining the difference between the determinant of the elastic fusion transformation and the identity transformation. The higher the deviation, the lower the similarity, hence the degree of deviation can be used to determine a measure of similarity.

A measure of similarity can for example be determined on the basis of a determined correlation between the first and second datasets.

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures, wherein

FIG. 2 shows an embodiment of the method according to the first aspect;

FIGS. 3a to 3e illustrate the volume correlation algorithm;

DESCRIPTION OF EMBODIMENTS

Figure 1:
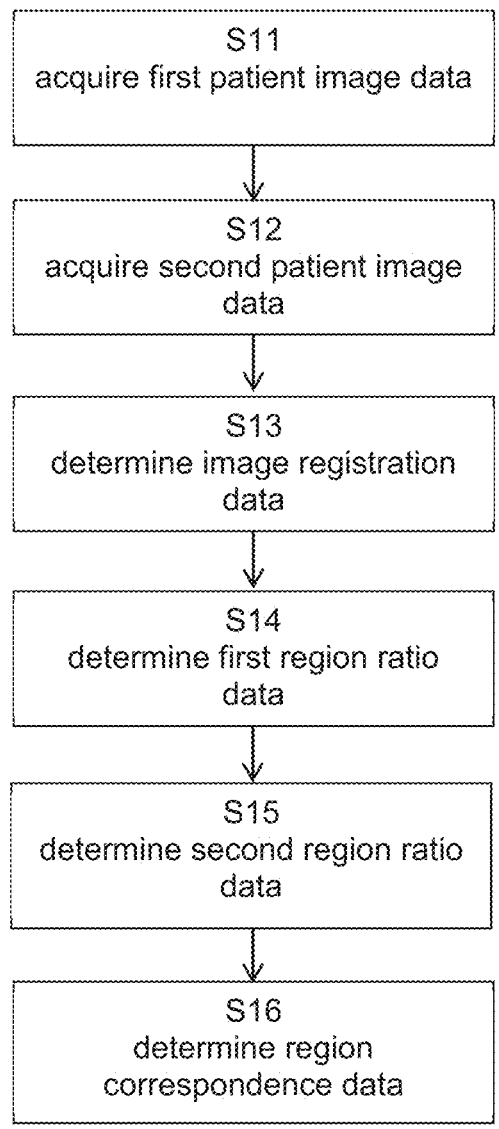
FIG. 1 illustrates the basic flow of the method according to the first aspect.
Figure 4:
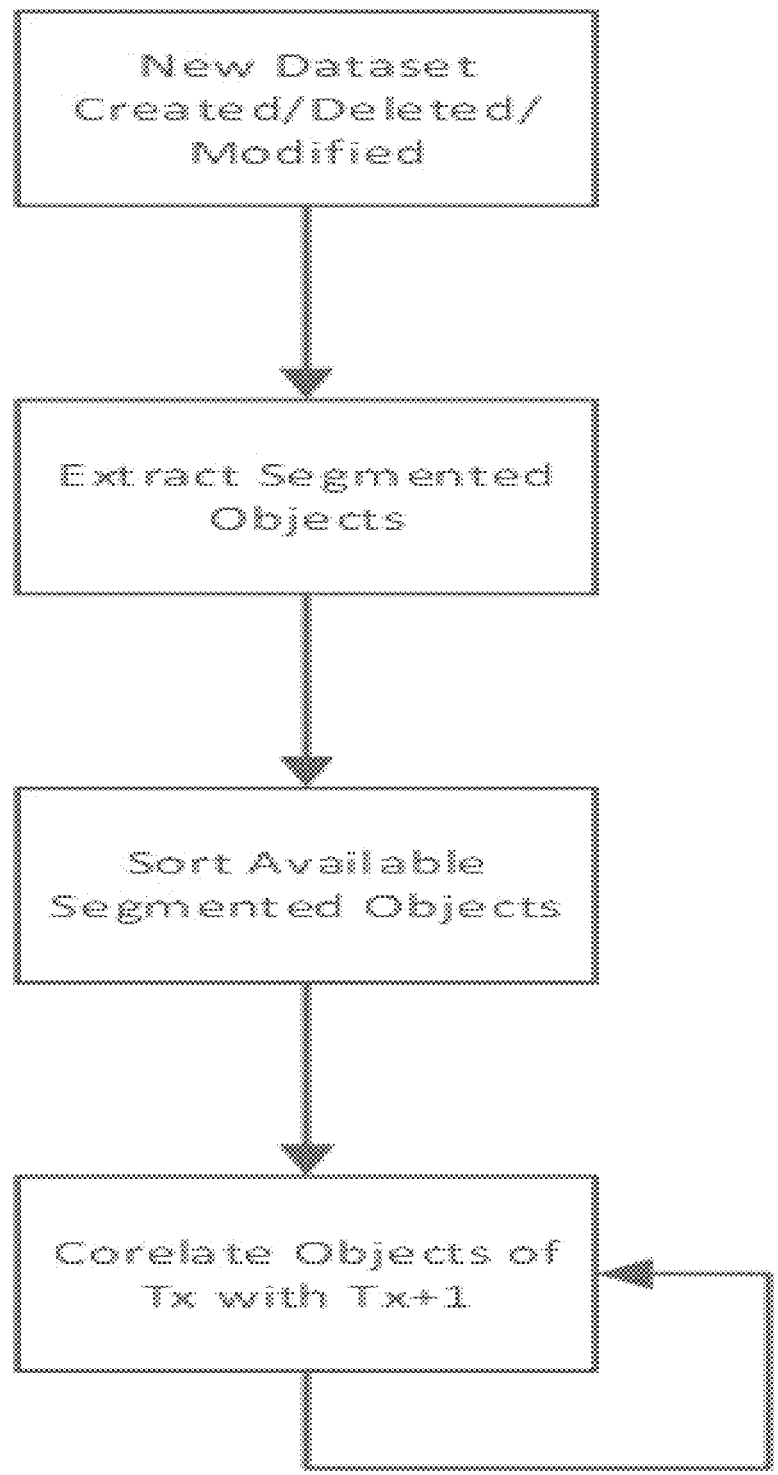
FIG. 4 illustrates a sort and correlate workflow.

FIG. 1 illustrates the basic steps of the method according to the first aspect, in which step S11 encompasses acquisition of the first patient image data and step S12 encompasses acquisition of the second patient image data. Subsequent step S13 uses the first and second patient image data as a basis for determining the image registration data. Then, the first region data is determined in step S14 which is followed by determining the second region ratio data in step S15. Finally, the region correspondence data is determined in step S16.

FIG. 2 illustrates the workflow of an embodiment of the method according to the first aspect which is performed by a software module called Volume Correlation Performer (VCP). In step S21, the first and second patient image data is input as three-dimensional scan datasets with DICOM segmented objects. In subsequent step S22, the method fuses the current and the timewise last available image series with a fusion algorithm to bring all objects of interest into the same reference system. The method then calculates, in step S23, the intersection volume of the object of interest, and in step S24 the intersection volume of pairs of objects of interest in the same time series. The resulting enriched dataset (the first and the second patient image data together with information linking corresponding image constituents, provided the predetermined threshold is reached) is output in step S25.

The details of determining corresponding objects are explained in the following. The matching of counterpart objects segmented on consecutive 3D scans (current and last available series) is calculated in two steps:

Step 1: Fusion of two image series

The tool fuses current and last available series with a rigid fusion (not limited to rigid) to bring all objects of interest into the same coordinate system.

Step 2: Intersection and matching calculation

The tool calculates, on consecutive scans, the intersection volume of the object of interest in the current series (B) and each object in the last available series (A). The resulting value is divided by the volume of each object of the pair according to the following formula:

$$A \cdot B / A$$

and $$A \cdot B / B$$

where A is the object (specifically, the volume of the object) in the last available series and B is the object (specifically, the volume of the object) in the current series.

Resulting values above an exemplary threshold of 40% indicates matching objects. The higher the resulting value, the stronger the matching relation between the two objects. The same formula is applied to all available longitudinal datasets. Each pair of consecutive series whose value is above the threshold is connected forming a chain of pairs.

The method according to the first aspect may be embodied by a software module called Volume Correlation Performer (VCP) which is a general-purpose, extensible, DICOM image processing tool that automatically matches overlapping/counterpart objects of interest (i.e. DICOM Segmentation objects) segmented on the same three-dimensional scan image or on longitudinal three-dimensional scan images (obtained at different points in time). This new feature is referred to in this disclosure as "object matching".

Imaging and image analysis have become an essential component in many fields of medical research and clinical practice. Thus, possible applications of such tool include (but are not limited to):

clinical research (e.g. cancer registry) with automatic data enrichment—this tool enriches and adds value to the sets of image data routinely obtained in the clinical setting and used for research; and tumour board meetings, where unambiguous evaluation of tumour progression over time is crucial for management of tumour patients.

The volume correlation workflow processing is explained in the following with reference to FIGS. 3a to 3e and 4.

In the following, a definition of terminology used in this disclosure is offered.

Segmented object—a DICOM object of interest outlined on an image. For example, a Tumor that was outlined over MR images.

Correlation link—a representation of a single link between two segmented objects representing the same real world object.

Correlation chain—a chain of correlation links between multiple segmented objects across multiple datasets over time.

Correlation algorithm—the set of instructions defining matching correlation percentage between two segmented objects.

Building a correlation chain of segmented objects over time can conclude that all segmented objects in the chain represent the same real world object (for example, the same organ). This enables tracking changes in the object (for example, object volume changes over time).

Such logic may be cumbersome and error prone for humans. The logic can be implemented in a computer software to run automatically whenever a new dataset is available producing accurate results.

The correlation workflow logic defines how segmented object can be tracked. A set of rules can be defined on when to execute the correlation algorithm and how to process and store the results. A structured model can be defined for representing the correlation link between segmented objects and the correlation chain of multiple links over time. The workflow logic can be implemented to filter out correlation links results which are unlikely represent a real relation between two objects and only consider the relevant links.

The workflow should consider different use cases of changes to the segmented object:

a. A segmented object may be missing in a dataset and appear again later in a consequent dataset.
b. A segmented object may split into multiple other segmented objects.
c. A segmented object may be merged from multiple segmented object into one.

The workflow logic should be triggered whenever a new dataset is available. The logic will try to match any of the newly created segmented objects in the dataset to previously stored segmented objects, using the following five steps:

1. Sa and Sb are segmented objects created at time T1 (cf. FIG. 3a).
2. No chains are available, the workflow logic defines each of the segmented object as a single object chain (cf. FIG. 3b).
3. Sc and Sd are segmented objects created at time T2>T1 (cf. FIG. 3c).
4. The workflow algorithm sorts the segmented objects based on their creation time and runs the correlation algorithm between all objects in one data point to the next data point (cf. FIG. 3d).
5. The percentage results represent the probability that one segmented object correlates to another. The workflow logic review the results and uses a threshold filter to decide which link should be used for connecting a chain. For the above example, such threshold configured as higher than 15% may results with three chains as illustrated in FIG. 3e.

The sort and correlate workflow (cf. FIG. 4) guarantees to get the most accurate correlation chain between objects and is applicable for any of the following use cases:

a. A dataset may be available in an arbitrary order.
b. A segmented object may be deleted after a link was already created.
c. A segmented object may be changed (updated) after a link has been created.

Figure 5:
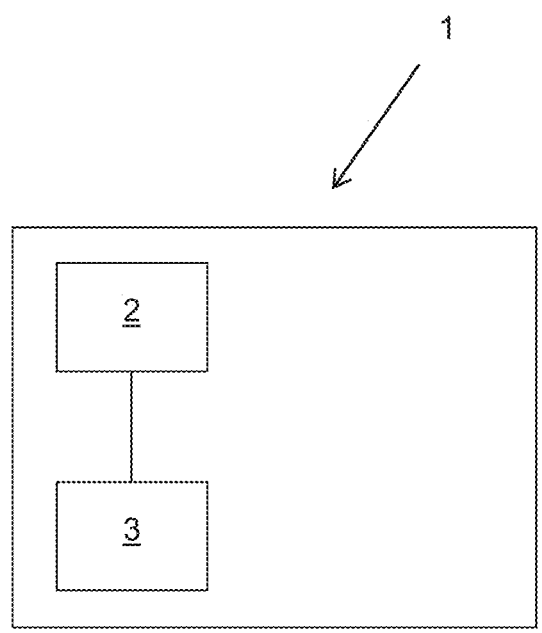
FIG. 5 is a schematic illustration of the system according to the fifth aspect.

FIG. 5 is a schematic illustration of the medical system 1 according to the fifth aspect. The system is in its entirety identified by reference sign 1 and comprises a computer 2, at least one electronic data storage device (such as a hard disc) 3 for storing at least the patient image data and the atlas data. The components of the medical system 1 have the functionalities and properties explained above with regard to the fifth aspect of this disclosure.

The invention claimed is:

1. A computer-implemented medical method of determining a position of a region of interest described by a first medical image of an anatomical body part in a second other medical image of the anatomical body part, the method comprising:

first patient image data is acquired which describes a first medical patient image of the anatomical body part including information about the position of an image representation in the first medical patient image of the region of interest, wherein the region of interest is part of the anatomical body part;

second patient image data is acquired which describes a second medical patient image of the anatomical body part, wherein the second medical patient image comprises virtual objects each describing a subset of the anatomical body part and comprises an image representation in the second medical patient image of the region of interest;

image registration data is determined based on the first patient image data and the second patient image data, wherein the image registration data describes a mapping between the region of interest described by the first medical patient image and at least one of the virtual objects;

first region ratio data is determined based on the first patient image data and the second patient image data and the image registration data, wherein the first region ratio data describes a ratio between the volume of the region of interest described by the second medical patient image and the volume of an intersection of the region of interest described by the first medical patient image with each one of the virtual objects onto which the region of interest described by the first medical patient image is mapped by the mapping between the region of interest described by the second medical patient image and the at least one virtual object;

second region ratio data is determined based on the first patient image data and the second patient image data and the image registration data, wherein the second region ratio data describes a ratio between the volume of the region of interest described by the first medical patient image and the volume of an intersection of the region of interest described by the first medical patient image with each one of the virtual objects onto which the region of interest described by the first medical patient image is mapped by the mapping between the region of interest described by the second medical patient image and the at least one virtual object;

region correspondence data is determined based on the first region ratio data and the second region ratio data, wherein the region correspondence data describes that the region of interest described by the first medical patient image corresponds to the region of interest described by the second medical patient image if a greater one of the ratio described by the first region ratio data and the ratio described by the second region ratio data is greater than a predetermined threshold.

2. The method according to claim 1, wherein the region of interest comprises or consists of an image representation of a medical anomaly being at least one of a neural fibre, a cavity, a haemorrhage, a necrosis, and arteriovenous malformation, a tumour or an electrode.

3. The method according to claim 1, wherein the volume of each of the virtual objects is determined by determining an envelope for each of the virtual objects which is defined by extreme values of coordinates of the position of the respective virtual object and wherein the volume of the region of interest described by the first medical patient image and the second medical patient image is determined by determining an envelope for the region of interest in the first medical patient image and the second medical patient image which is defined by the extreme values of the coordinates of the position of the region of interest.

4. The method according to claim 1, wherein the volume of each of the virtual objects is determined by counting image units comprised in each of the virtual objects and wherein the volume of the region of interest described by the first medical patient image and the second medical patient image is determined by counting the image units comprised in the region of interest in the first medical patient image and the second medical patient image.

5. The method according to claim 1, wherein the region correspondence data is determined only if no correspondence has been established for the region of interest described by the second medical patient image beforehand.

6. The method according to claim 1, wherein the first patient image data and the second patient image data are different from one another.

7. The method according to claim 1, wherein the first medical patient image and the second medical patient image belong to a time series of medical patient image data sets, wherein the first medical patient image data and the second patient image data were generated at next neighbouring points in time along the time series.

8. The method according to claim 1, wherein the first medical patient image and the second medical patient image belong to a time series medical patient image data sets, wherein the method comprises a step of:

adding, to the time series, third patient image data which describes a third medical patient image of the anatomical body part including information about the position of an image representation in the third medical patient image of the region of interest, wherein the third patient image data was generated at a point of time along the time series lying in between the points in time at which the first patient image data and the second patient image data were generated, wherein the point of time at which the third patient image data was generated is a next neighbour along the time series to the points of time at which the first patient image data and the second patient image data were generated, wherein the region correspondence data is determined based on the first patient image data and the third patient image data by using the third patient image data as the second patient image data, and wherein the region correspondence data is determined based on the third patient image data and the second patient image data by using the third patient image data as the first patient image data.

9. The method according to claim 1, wherein the patient image data is defined in three dimensions.

10. A non-transitory computer-readable storage medium comprising program instructions, wherein the program instructions are executed by at least one processor to determine a position of a region of interest described by a first medical image of an anatomical body part in a second other medical image of the anatomical body part, the instructions comprising steps in which:

first patient image data is acquired which describes a first medical patient image of the anatomical body part including information about the position of an image representation in the first medical patient image of the region of interest, wherein the region of interest is part of the anatomical body part;

second patient image data is acquired which describes a second medical patient image of the anatomical body part, wherein the second medical patient image comprises virtual objects each describing a subset of the anatomical body part and comprises an image representation in the second medical patient image of the region of interest;

image registration data is determined based on the first patient image data and the second patient image data, wherein the image registration data describes a mapping between the region of interest described by the first medical patient image and at least one of the virtual objects;

first region ratio data is determined based on the first patient image data and the second patient image data and the image registration data, wherein the first region ratio data describes a ratio between the volume of the region of interest described by the second medical patient image and the volume of an intersection of the region of interest described by the first medical patient image with each one of the virtual objects onto which the region of interest described by the first medical patient image is mapped by the mapping between the region of interest described by the second medical patient image and the at least one virtual object;

second region ratio data is determined based on the first patient image data and the second patient image data and the image registration data, wherein the second region ratio data describes a ratio between the volume of the region of interest described by the first medical patient image and the volume of an intersection of the region of interest described by the first medical patient image with each one of the virtual objects onto which the region of interest described by the first medical patient image is mapped by the mapping between the region of interest described by the second medical patient image and the at least one virtual object;

region correspondence data is determined based on the first region ratio data and the second region ratio data, wherein the region correspondence data describes that the region of interest described by the first medical patient image corresponds to the region of interest described by the second medical patient image if a greater one of the ratio described by the first region ratio data and the ratio described by the second region ratio data is greater than a predetermined threshold.

11. A medical system, comprising:

at least one computer having at least one processor and associated memory storing computer instructions to cause the at least one processor to:

acquire first patient image data which describes a first medical patient image of the anatomical body part including information about a position of an image representation in the first medical patient image of a region of interest, wherein the region of interest is part of the anatomical body part;

acquire second patient image data which describes a second medical patient image of the anatomical body part, wherein the second medical patient image comprises virtual objects each describing a subset of the anatomical body part and comprises an image representation in the second medical patient image of the region of interest;

determine image registration data based on the first patient image data and the second patient image data, wherein the image registration data describes a mapping between the region of interest described by the first medical patient image and at least one of the virtual objects;

determine first region ratio data based on the first patient image data and the second patient image data and the image registration data, wherein the first region ratio data describes a ratio between the volume of the region of interest described by the second medical patient image and the volume of an intersection of the region of interest described by the first medical patient image with each one of the virtual objects onto which the region of interest described by the first medical patient image is mapped by the mapping between the region of interest described by the second medical patient image and the at least one virtual object;

determine second region ratio data based on the first patient image data and the second patient image data and the image registration data, wherein the second region ratio data describes a ratio between the volume of the region of interest described by the first medical patient image and the volume of an intersection of the region of interest described by the first medical patient image with each one of the virtual objects onto which the region of interest described by the first medical patient image is mapped by the mapping between the region of interest described by the second medical patient image and the at least one virtual object;

determine region correspondence data based on the first region ratio data and the second region ratio data, wherein the region correspondence data describes that the region of interest described by the first medical patient image corresponds to the region of interest described by the second medical patient image if a greater one of the ratio described by the first region ratio data and the ratio described by the second region ratio data is greater than a predetermined threshold;

at least one electronic data storage device storing at least the first patient image data and the second patient image data; and wherein the at least one computer is operably coupled to the at least one electronic data storage device for acquiring, from the at least one data storage device, at least the first patient image data and the second patient image data, and the at least one electronic data storage device for storing, in the at least one data storage device, the region correspondence data.

12. A radiation treatment planning station comprising the system according to claim 11.

* * * * *